June 30, 1942.  O. A. HOKANSON  2,288,526
AUTOMATIC PHONOGRAPH
Filed Oct. 16, 1937  9 Sheets-Sheet 1

Inventor
Otto A. Hokanson
by Walter P. Guye
Attorney

June 30, 1942.　　　O. A. HOKANSON　　　2,288,526
AUTOMATIC PHONOGRAPH
Filed Oct. 16, 1937　　　9 Sheets-Sheet 2

Fig. 3.

Inventor
Otto A. Hokanson,
by Walker P. Geyer
Attorney

June 30, 1942.  O. A. HOKANSON  2,288,526
AUTOMATIC PHONOGRAPH
Filed Oct. 16, 1937  9 Sheets-Sheet 5

Inventor
Otto A. Hokanson,
by Walter P. ____
Attorney

June 30, 1942. O. A. HOKANSON 2,288,526
AUTOMATIC PHONOGRAPH
Filed Oct. 16, 1937 9 Sheets-Sheet 8

Inventor
Otto A. Hokanson,
by Walter P. Guyer
Attorney

June 30, 1942.   O. A. HOKANSON   2,288,526
AUTOMATIC PHONOGRAPH
Filed Oct. 16, 1937   9 Sheets-Sheet 9

Patented June 30, 1942

2,288,526

UNITED STATES PATENT OFFICE 2,288,526

AUTOMATIC PHONOGRAPH

Otto A. Hokanson, North Tonawanda, N. Y., assignor to The Rudolph Wurlitzer Company, North Tonawanda, N. Y., a corporation of Ohio Application October 16, 1937, Serial No. 169,442

22 Claims. (Cl. 274—10)

This invention relates to certain new and useful improvements in automatic selective phonographs.

One of its objects is to improve and structurally simplify the type of phonograph shown in my copending application, Serial No. 96,642, now Patent No. 2,096,718, granted October 26, 1937, wherein the records are supported upon the turntable in stack-like fashion, and wherein means are provided for elevating the turntable to an elevation in accordance with the record selected and for dividing or separating the record-stack at the record selected to provide a space for the movement of the tone arm for playing the selected or chosen record.

Another object of the invention is to provide an automatic selective phonograph of this character having novel and simple means for selectively controlling the playing of one or more records.

Other objects and features of the invention reside in the construction and arrangement of parts hereinafter described and particularly pointed out in the appended claims.

In the accompanying drawings.

Similar characters of reference indicate corresponding parts throughout the several views.

In its general organization, this automatic selector phonograph comprises a vertically reciprocating turntable which constitutes a support for a plurality of records disposed in stack-like fashion axially of the turntable; a selector-elevating mechanism movable at a predetermined time into supporting engagement with those records in the stack immediately above the one pre-selected for play, for elevating such supported records to split the stack and provide an operating space for the movement of the tone arm during the playing of the selected records; a tone arm mounted to swing in a definite horizontal plane and pivoted to swing vertically into engagement with the record or to a position to clear it when the tone arm is returned to its initial position after playing the record; an elevating mechanism for the turntable which functions to elevate the turntable to varied elevations corresponding to those of the records selected, and operating at a time prior to that of the selector-elevating mechanism to bring the selected record at its proper playing elevation, after which such selector-elevating mechanism splits the record stack and moves it a definite and constant height, as compared with the elevating mechanism of the turntable which moves the turntable a variable height to effect and govern the selection; and a plurality of selector members or push buttons for simultaneously selecting at the will of the user a plurality of records to be played and included in a selective control circuit which governs the automatic playing of the records selected.

Figure 1:
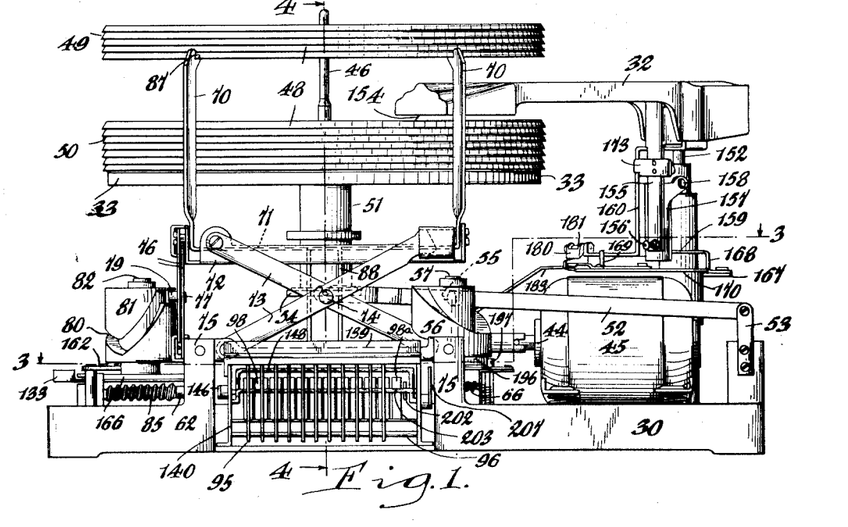
Figure 1 is a front elevation of the multi-selective phonograph embodying my invention, and showing the parts in record-playing position.
Figure 2:
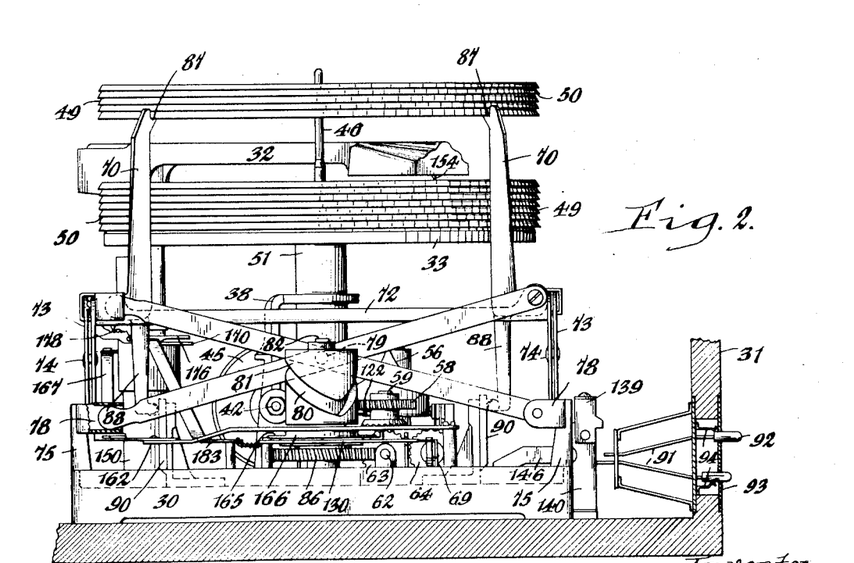
Figure 2 is a side elevation thereof with a portion of the selector-button assembly in section.
Figure 4:
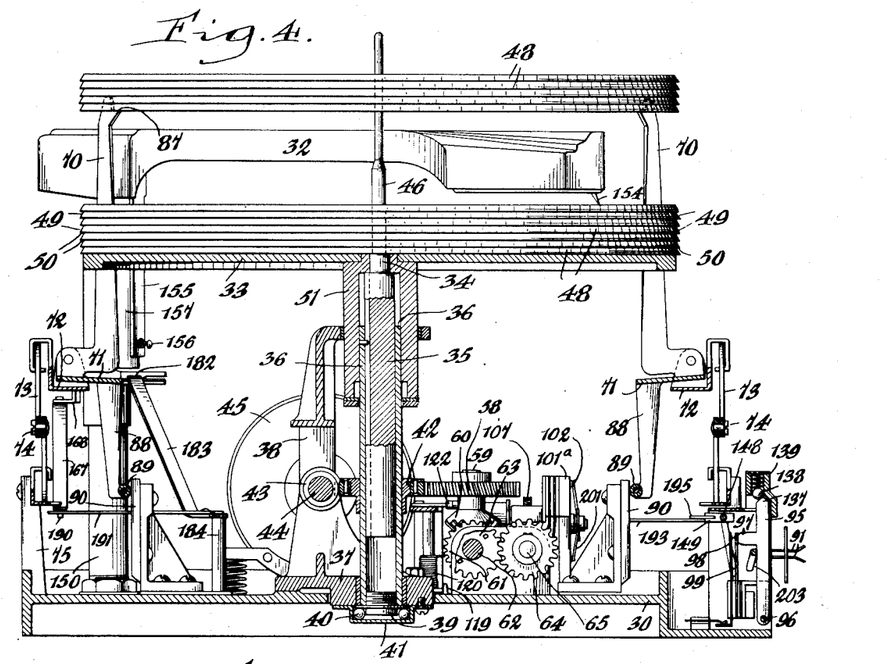
Figure 4 is an enlarged transverse vertical section taken substantially in the plane of line 4—4, Figure 1.

Referring now to the drawings, showing more particularly the chassis of a phonograph, 30 indicates a supporting platform or frame upon which the working parts of the phonograph are mounted, and which platform, in practice, is mounted in a cabinet of appropriate design, the numeral 31 indicating a portion of the cabinet. The tone arm, indicated generally at 32, may be of usual construction and is mounted to assume a definite horizontal plane of movement. The turntable 33 is mounted on an upright spindle 34 whose lower portion 35 is keyed or feathered to a revolving sleeve 36 journaled in the base 37 of an upright bearing bracket 38 secured to the platform. At the lower end of the sleeve 36 is a flanged cap or plug 39 which prevents the sleeve from pulling up and also forms a seat for thrust-bearings 40 mounted in a case 41 secured to the bracket-base 37. Applied to the sleeve 36 is a driven gear 42 meshing with a drive pinion 43 secured to the shaft 44 of an electric motor 45. The upper portion 46 of the spindle constitutes a guide post for the records 47, the latter being supported in suitable trays or carriers 48. As shown in Figures 1, 2 and 4, the records are disposed in superposed relation in the form of a stack, being normally directly supported on the turntable, and being capable of sliding on the spindle-extension 46 during the selection of the desired record to be played. It will be observed in these figures that the peripheral edges of the trays 48 slope upwardly and inwardly, as indicated at 49, whereby resulting shoulders 50 are provided at the bottom peripheral edges of the trays, the whole stack giving the appearance, at the peripheral profile, of a series of ratchet teeth, all for the purpose to be hereinafter described. Fixed to the spindle 34 and constituting a support for the turntable is a collar 51 with which the elevating mechanism for the turntable is adapted to engage.

The means for elevating the turntable to variable heights in accordance with the selected record to be played and for lowering it after play, consists of an actuating arm 52 whose outer end is pivoted to a bracket 53 rising from the base 30 and whose inner bifurcated end is pivoted to diametrically opposite sides of a ring 54 bearing against the underside of the collar 51 and having an elongated opening 54a therein engaging the spindle-sleeve 36, so that when this arm is vertically actuated it causes the vertical reciprocation of the turntable. Intermediate its ends the arm 52 has a roller 55 which engages a cylindrical elevationg cam 56 fixed on the upper portion of an upright shaft 57 which is driven at predetermined times in the cycle of operations to elevate the turntable to different record-playing positions. Motion is transmitted to the cam shaft 57 from the motor shaft 44 and spindle-revolving gear 42 through the medium of a gear 58 meshing with the latter and mounted on an upright shaft 59 having a bevel gear 60 thereon which meshes with a like gear 61 mounted on a horizontal shaft 62 journaled in suitable bearings applied to the platform 30. Loosely mounted on said shaft 62 is a clutch-controlled gear 63 meshing with a similar gear 64 fixed on one end of a countershaft 65 likewise journaled in suitable bearings applied to the platform and provided at its opposite end with a worm 66 meshing with a worm wheel 67 fixed to the lower end of the cam shaft 57. A sliding clutch-collar 68 keyed to the shaft 62, and actuated by a clutch lever 69, serves at predetermined times to clutch the gear 63 to said shaft and accordingly transmit motion to the cam shaft 57. Mechanism hereinafter described, is provided for automatically shifting the clutch lever to its applied and released positions to transmit motion to the turntable elevating cam and arrest it at the predetermined elevation corresponding to that at which the selected record is played.

After the selected record in the stack is moved by the turntable to its predetermined playing elevation, and which elevation is variable for each record because of the fact that the tone arm of the phonograph remains at a fixed elevation, it is then necessary to split the record-stack and to elevate those records, above the selected record, as a unit to provide an operating clearance for the movement of the tone arm during the playing of the selected record. By preference, this elevating of the records to split or divide the stack vertically is accomplished as follows:

Disposed at diametrically opposite sides of the turntable for releasable interlocking engagement with the records to support and elevate them above the plane of movement of the tone arm are pairs of upright supporting arms 70 which at predetermined times are adapted to be automatically brought into supporting engagement with those records above the selected one to elevate them and again to be automatically lowered and subsequently released therefrom after the playing of a selected record and before the selection of another record. Each pair of supporting arms constitutes part of an upright U-shaped rock bar 71 pivoted to rock about a horizontal axis in a supporting frame 72 which is U-shaped in plan, with the rock bars disposed in the leg portions thereof. Connected to the leg portions of this supporting frame to raise and lower the same, are elevating units which may be in the form of crossed levers 73 pivoted intermediate their ends to one another at 74 and slidingly and pivotally joined at their free ends to the frame 72 and to brackets 75 rising from the platform 30, as shown in Figures 1 and 2. Also connected to the ends of the web portion of the U-frame 72 are similar crossed levers 76 which are pivoted intermediate their ends at 77 and are slidingly and pivotally joined at their free ends to the U-frame and to extensions 78 formed on one set of the brackets 75, as shown in Figure 2. By this construction, as the sets of levers 73 and 76 are expanded and contracted, the record-engaging arms 70 are simultaneously raised and lowered, as a unit, the levers acting after the fashion of lazy tongs. Applied to the pivot 77 of the cross levers 76 is a roller 79 which engages a substantially spiral-shaped cam groove 80 formed in a revolving sleeve or cylindrical cam 81 mounted on an upright shaft 82 for moving the record-engaging arms to and from a constant elevation. Motion is transmitted to the cam shaft 82 from the motor shaft 44 through the medium of the shaft 62 on which the clutch collar 68 is mounted. This clutch collar, when shifted to the left, viewing Figures 3 and 5, engages a collar 83 applied to the end of a worm 85 loosely mounted on the shaft 62 and meshing with a worm wheel 86 fixed on the lower end of the cam shaft 82. Thus, when the clutch collar 68 is coupled with the collar 83, motion is transmitted to the cam shaft 82 to cause the crossed levers 76 to expand and contract and accordingly raise and lower the record-supporting arms 70.

In the lowered retracted position of the supporting arms 70, the toothed record-engaging portions 87 thereof assume a definite predetermined elevation relative to the horizontal plane of movement of the tone arm, the top record of the stack being below that elevation, so that when the turntable is elevated to a predetermined height to play a selected record, the upwardly-facing shoulders of the arm-teeth 87 will be so disposed as to be in a plane substantially at or somewhat below the top surface of the record to be played, whereby when the arms 70 are rocked inwardly, they will engage the peripheral edge-shoulder 50 of the record tray immediately above the selected record and upon expansion of the cross levers 73 and 76 the records supported by these arms will accordingly be elevated to provide an operating clearance space for the tone arm. The means for rocking each of the bars 71 carrying the record-engaging arms 70 inwardly, after the selected record has been brought by the turntable to an elevation corresponding to its playing position, consists of an actuating arm or yoke 88 depending from each bar and provided at its lower end with a follower-roller 89 engaging a companion upright cam bar 90 fixed to and rising from the platform 30. In the lowered inoperative position of the arm-carrying frame 72, these rollers contact the companion cams at their lower ends, in which position the record-engaging arms 70 are in their retracted position and free from engagement with the peripheral edges of the record trays. Immediately upon the upward movement of the arm-carrying frame, because of the expansion of the levers 73 and 76, the actuating yokes 88 are swung outwardly and the record-engaging arms are swung inwardly into gripping engagement with the peripheral lower edge of the adjoining record-tray, or that record immediately above the one positioned for play.

Figures 5, 26:
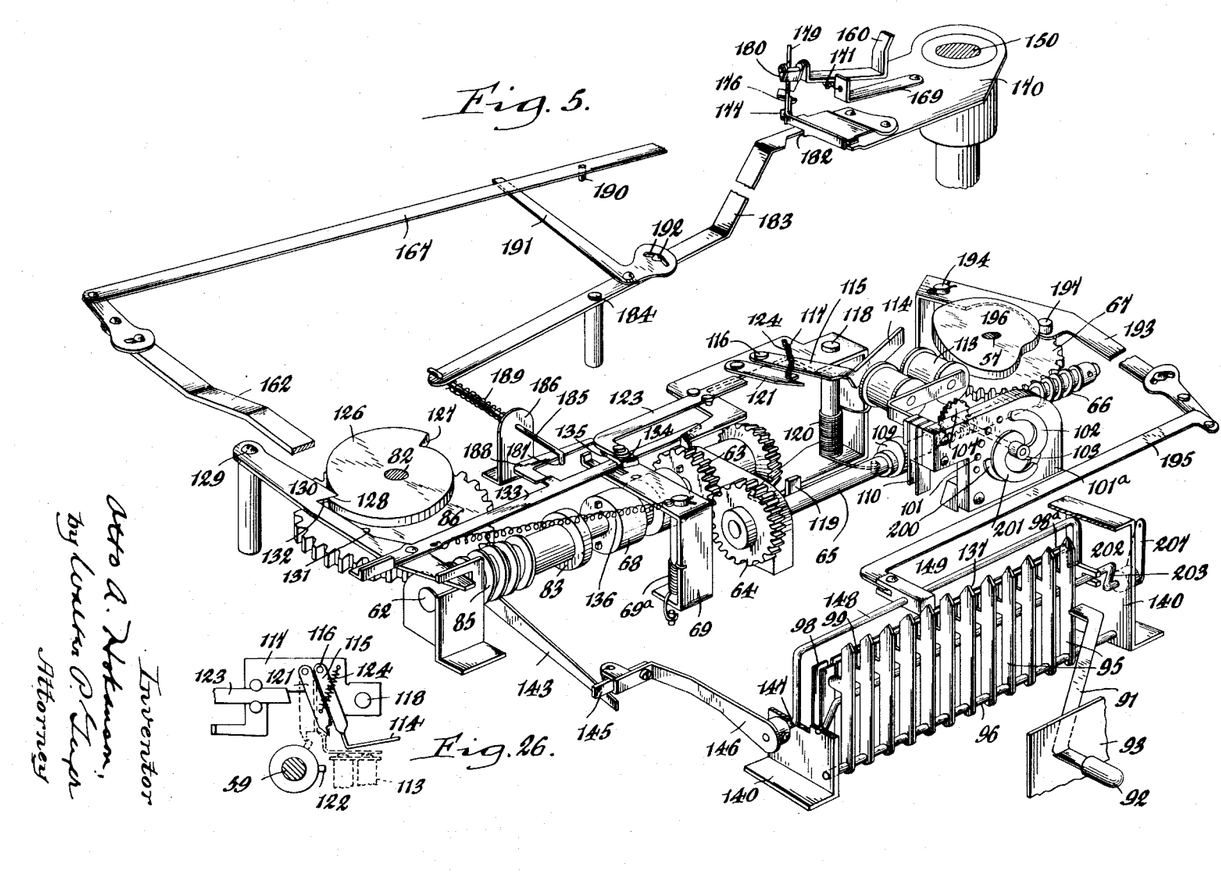
Figure 5 is a diagrammatic perspective view of the control mechanism of the phonograph.
Figure 26 is a fragmentary, top plan view of the selector-controlled, clutch-governing mechanism.
Figure 6:
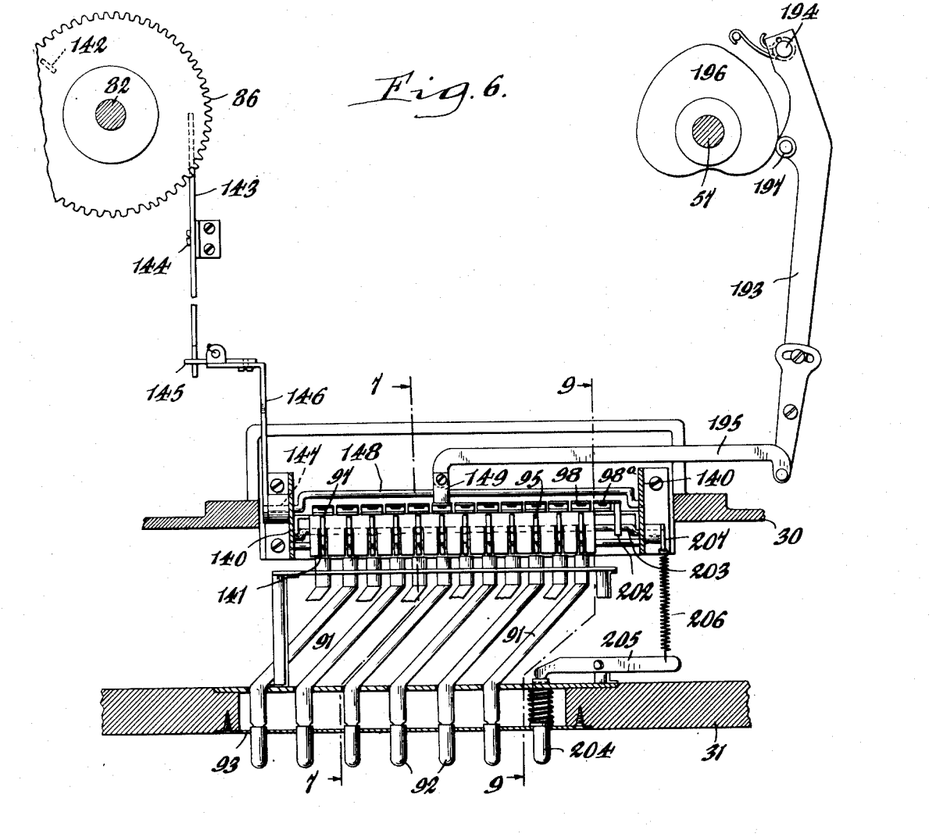
Figure 6 is a top plan view, partly in section, of the selector control mechanism.
Figure 7:
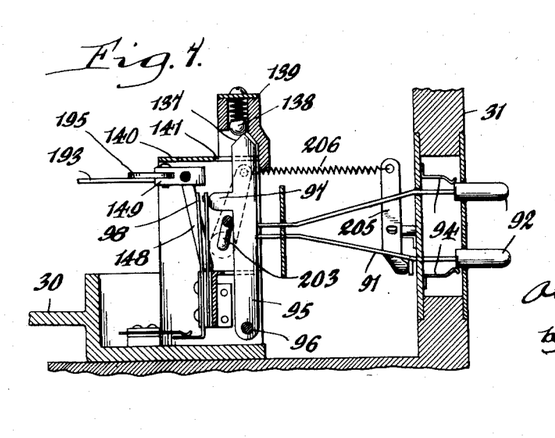
Figure 7 is a fragmentary vertical section taken in the plane of line 7—7, Figure 6.
Figure 8:
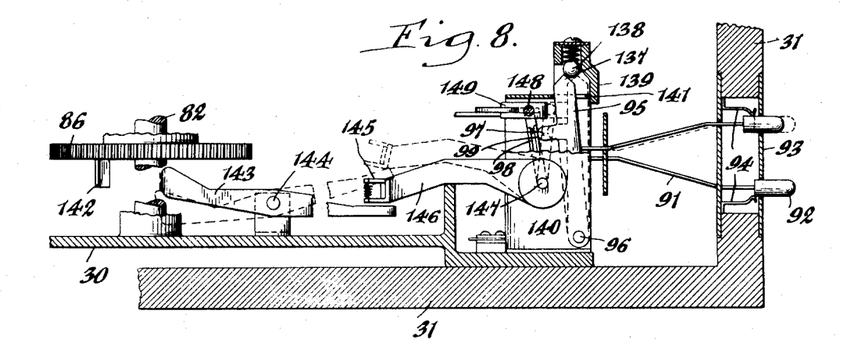
Figure 8 is a fragmentary side view, partly in section, showing the means for cancelling the selector mechanism.
Figures 9, 10, 11:
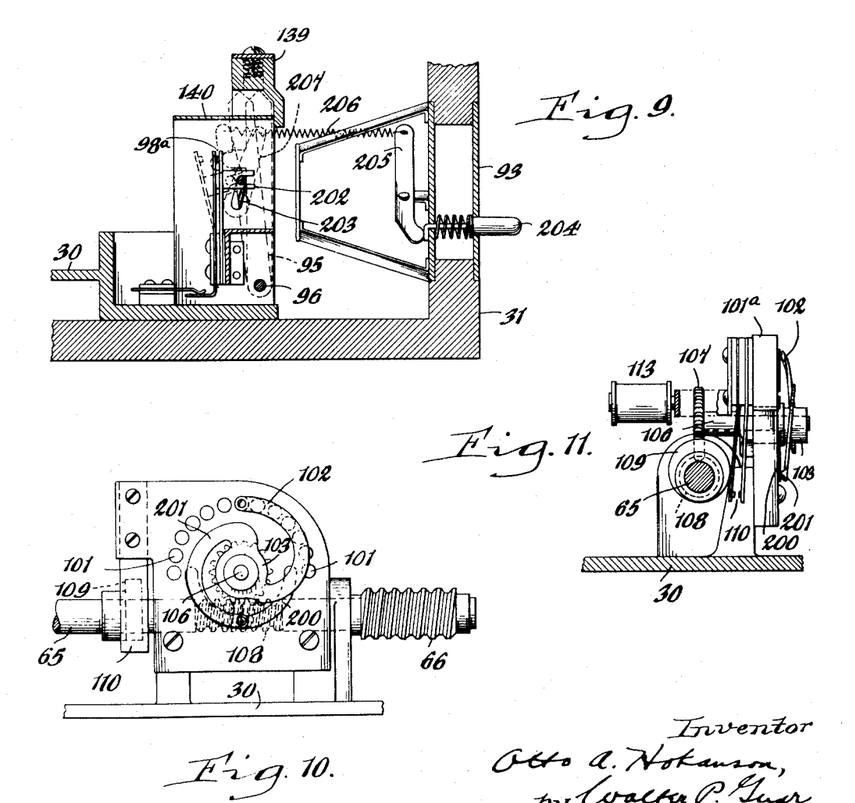
Figure 9 is a fragmentary vertical section taken in the plane of line 9—9, Figure 6.
Figure 10 is an enlarged plan view of the rotating selector switch.
Figure 11 is an end view of the same.

The means for governing the selection of the records and the selector mechanisms for controlling the raising and lowering of the turntable as well as the raising and lowering of those records in the stack above the selected one for play are preferably constructed as follows:

Mounted conveniently on the phonograph cabinet are a plurality of selector rods 91 having buttons or heads 92 at their front ends which correspond to the number of records in the stack and which extend through a face plate 93, the faces of the buttons being suitably marked by number or otherwise to correspond with the records. Flat springs 94 mounted on the front wall of the cabinet 31 and engaging the sides of the buttons 92 serve to frictionally maintain the rods 91 in their normal retracted position, shown in Figure 8. The selector rods are preferably disposed in two rows, as seen in Figures 6, 7 and 8, and each rod abuts at its inner end against a companion upright lever 95 pivoted at 96 and carries an abutment or projection 97 which is adapted to close a companion electric switch 98, 99 when the companion selector rod 91 is depressed, the switch element 98 constituting the movable blade of the switch and the element 99 constituting the stationary element and being common to the movable blades. Each switch is included in an electric circuit for governing the shifting of the clutch 68, 69 at a predetermined time, from its operative position, in engagement with the gear 63 to rotate the counter-shaft 65 and elevate the turntable 33, to its other operative position in engagement with the collar 83 to elevate the stack above the record selected for play. Leading from the button-actuated blade 98 of each switch, is a wire 100 which is connected to the companion post or terminal 101 of an annular row of terminals corresponding in number to the selector push rods 91 and with which one arm 102 of a two-armed revolvable contact or wiper member 103 is adapted to engage. The closing of the respective button-controlled switches 98, 99 merely serves to prepare or preset the circuit for automatically effecting, at such time as the circuit is fully established in a manner which will hereinafter appear, the playing of the records selected. It may be noted here, however, that the circuit to be established derives its power from the feed wires 104, 105 to which the drive motor 45 is also connected. This contact member is fixed on a shaft 106 having a gear 107 thereon meshing with a worm 108 applied to the counter-shaft 65 intermediate its ends, as shown in Figures 5 and 10, said contact member being rotated simultaneously with the drive mechanism controlling the vertical movements of the turntable. The shaft 106 and the contact member terminals 101 may be supported or applied to an upright insulating panel 101ᵃ rising from the platform 30.

Rotatable with the countershaft 65 is a cam 109 which controls the making and breaking of a switch 110 included in the circuit of the contact member 103 and one terminal of which is connected by a wire 111 with the shaft 106 to which said member is fastened. The relative speed of the contact-arm shaft 106 is such that for each revolution of the countershaft 65 the contact member 103 travels a distance equal to that between two adjoining terminals 101. The other terminal of this switch is connected by a wire 112 with an electromagnet 113 whose armature 114 is joined to a horizontally-swinging arm 115 pivoted at 116 to a fulcrum-plate 117 pivoted to an upright pivot pin 118 and free to swing in a limited path between stops 119. A spring 120 constantly urges this fulcrum-plate against one of the stops, as seen in Figure 5. Disposed alongside the arm 115 and in edgewise contact therewith to be moved thereby, is a trip arm 121, which, when the electromagnet 113 is energized, is swung to a position in the path of a tappet pin 122 applied to the hub of the bevel gear 60 of the upright shaft 59. When this pin encounters the trip arm 121, as shown in Figure 26, it further swings such arm into contacting relation with the opposing free end of a shifting bar 123 connected to the clutch-actuating lever 69, and shifts the clutch collar 68 out of driving engagement with the gear 63 to arrest the rotation of the countershaft 65 and its associated parts, and bring the turntable to rest at the elevation required for playing the selected record corresponding to that of the depressed push rod 91. A spring 124 serves to normally retain the armature-carrying arm 115 out of contact with the magnet and the trip arm 121 retracted and out of the path of travel of the tappet pin 122.

The common switch element 99 associated with the button-actuated switch elements 98 is connected to one terminal of a transformer 125 included in the main line circuit 104, 105, while the other terminal of this transformer is connected to the electro-magnet 113, whereby, when a selector button 92 is depressed, the circuit thus established includes the switch 99, selected button switch element 98, corresponding wire 100, and terminal post 101, contact member 103, shaft 106, wire 111, cam-actuated switch 110, wire 112, electromagnet 113 and thence to the common switch element 99.

The projected movement of the trip arm 121 by the trip pin 122 is sufficient to shift the clutch 68, 69 into clutching engagement with the collar 83 to in turn transmit motion to the cam shaft 82 to cause the crossed levers 73, 76 to expand and accordingly raise the record-supporting arms 70 to lift those records above the one selected for play and provide an operating space for the tone arm. Mounted on the cam shaft 82 for controlling the shifting of the clutch to a neutral position, and arrest the movement of the elevated stack at a predetermined position, is a cam 126 provided in its periphery with a comparatively deep notch 127 and a comparatively shallow notch 128. Pivoted at 129 alongside this cam in bearing contact therewith is a horizontally-swinging lever 130 which is provided with a recessed portion 131 forming a shoulder 132 for cooperative engagement with one or the other of the notches 127, 128. At its free end the lever 130 has pivotally connected thereto an oscillatable tie bar or link 133, shown in Figure 5, whose free end is reduced in width to provide a shoulder 134 adapted to abut against the opposing edge of the clutch-shifting lever 69, said tie bar having its reduced portion guided in a yoke 135 formed on the clutch lever. By swinging the tie bar in one direction its shoulder 134 is moved clear of abutting engagement with the yoke portion 135 of the clutch lever. By this construction, when the clutch 68, 69 is automatically shifted out of clutching engagement with the gear 63 and into clutching engagement with the collar 83, the tie bar 133 is accordingly shifted with it to swing the lever 130 in a direction to release its notched shoulder 132 from the cam notch 127, and accordingly permit the cam shaft 82 to revolve to elevate the record-engaging arms 70. A spring 136 applied to the tie bar 133 constantly urges the lever 130 toward the cam-periphery and when the arms 70 have reached their maximum height, shown in Figures 1, 2 and 4, the lever automatically swings into the shallow notch 128 of the cam and simultaneously actuates the tie bar 133 to shift the clutch to neutral position shown in Figure 5, and thereby arrest the record-engaging arms at the predetermined elevation required for playing the selected record.

Each of the selector-switch-actuating levers 95 is preferably beveled at opposite sides of its upper end, as indicated at 137 to provide abutments against one or another of which a companion spring-pressed ball 138 is adapted to engage for yieldingly retaining such lever in its projected or retracted position. These spring-pressed balls are arranged in a housing 139 applied to the upper end of a bearing frame 140 in which the levers 95 are pivoted and guided in notched portions 141 formed in such frame.

After a given selector rod 91 has been depressed to select a record for play, it is necessary to restore the companion upright lever 95 from its selected or projected position shown by full lines in Figure 8 to its initial retracted position shown by dotted lines in said figure, such restoring operation taking place after the turntable 33 has been elevated to the play position and simultaneously opening the switch 98, 99 associated with such rod. This is preferably accomplished automatically during the time that the record stack is split and being elevated clear of the selected record to be played, and to this end one of the parts revolving with the stack-elevating cam shaft 82, say the driven gear 86, is provided with a tappet 142 adapted to engage one end of a trip lever 143 pivoted at 144 to the adjoining part of the platform 30. The other end of the trip lever engages a laterally-swinging, spring-pressed toggle or link 145 pivoted to the opposing end of a rock lever 146 fixed on the adjoining end of the journal 147 of a vertically-swinging bail or crank 148 pivotally supported in the end walls of the bearing frame 140. Slidably mounted on the bail 148 for movement lengthwise thereof is a bar 149 for registering contact with the upper end of one or another of the projected levers 95. Thus, when the tappet 142 strikes the trip lever 143, it causes the rock lever 146 to rock in a direction to swing the bail 148 forwardly to bring the slide bar 149 into engagement with the respective lever 95 to restore it and its companion switch element 98 to open position.

Figure 3:
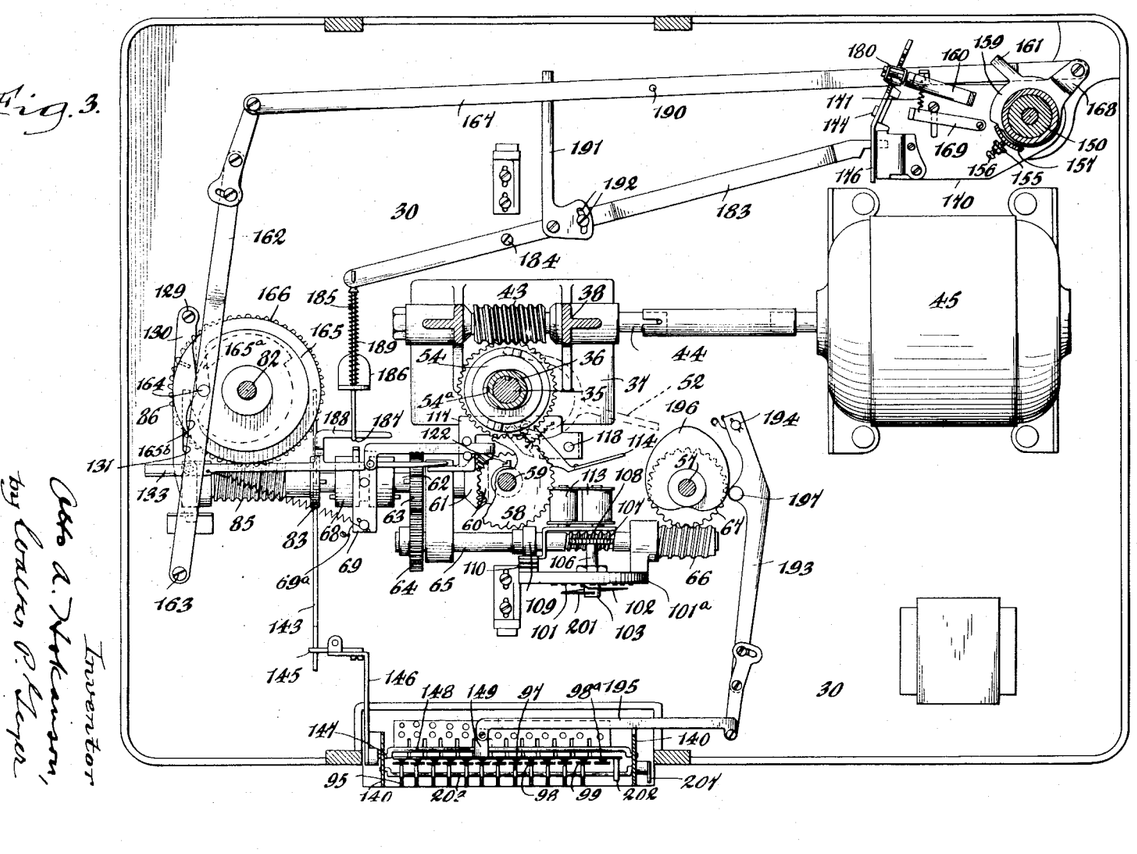
Figure 3 is an enlarged horizontal section taken substantially in the plane of line 3—3, Figure 1.
Figures 12, 13:
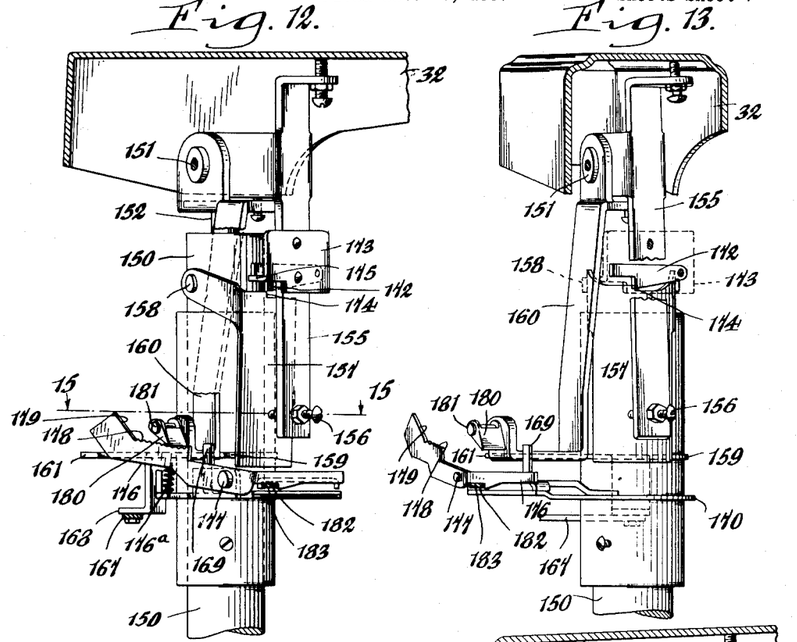
Figure 12 is a side elevation, partly in section, of the tone arm and its associated parts.
Figure 13 is a front elevation, partly in section, of the tone arm and its associated parts, the tone arm being in its non-play position.
Figure 14:
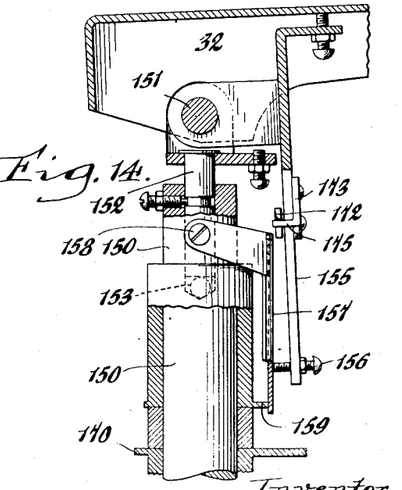
Figure 14 is a vertical sectional view of the tone arm and associated parts, with the tone arm in its non-play position.
Figure 15:
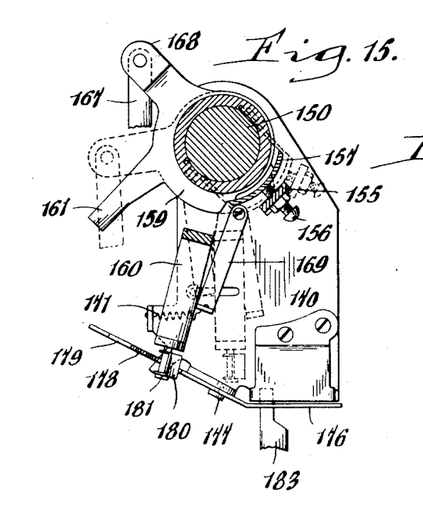
Figure 15 is a horizontal section taken on line 15—15, Figure 12.

The means for actuating the tone arm 32 to bring it into play position over the record selected for play, after the turntable 33 has been elevated and the stack of records split above the selected one as heretofore described, and for returning the tone arm to its initial starting position after the selected record has been played, is preferably constructed as follows:

The numeral 150 indicates the upright supporting post or column about which the tone arm revolves in a definite horizontal plane, the tone arm being pivoted to swing vertically about a pivot 151 applied to the yoke portion of an upright stem 152 journaled in a step bearing 153 of the post 150, this vertical swinging of the tone arm being necessary in bringing its reproducing needle 154 into engagement with a record for play or out of engagement therewith when swinging outwardly over the record after play. Also fulcrumed on the pivot 151 is a laterally-swinging depending brace or stay bar 155 which moves with the tone arm and which is provided at its lower end with an adjusting screw 156 in contact at its inner end with a laterally-swinging pendant back plate or yoke 157 disposed alongside the post 150 and pivoted at 158 to the upper end of the latter as shown in Figures 12 and 14. Mounted on the post adjoining this pendant back plate to turn thereon, is a cam member or sleeve 159 which rides against the inner face of this back plate and thereby causes the latter to swing in a direction away from or toward the post to in turn effect, through the medium of the stay bar 155, the raising or lowering of the tone arm out of or into engagement with the record. In the non-play or outwardly-swung position of the tone arm, shown in Figure 14, the cam member 159 is abutting the back plate to support the tone arm in its elevated position. Depending from the upper or yoke portion of the tone arm stem 152 in adjoining relation to the stay bar 155 is a substantially L-shaped bar 160 which likewise moves with the tone arm and against the lower end of which a substantially radial lug 161 projecting from the cam member 159 is adapted to abut, so that when motion is transmitted to this cam member its lug 161 encounters the horizontal portion of the L-shaped bar 160 and causes the tone arm to swing outwardly to its initial non-play position after a given record has been played. The means for transmitting motion to the cam member for controlling the return swinging movement of the tone arm to its inoperative position, and at a time prior to that when the cylindrical cam 81 functions to contact the cross levers 73, 76 to lower the record-supporting fingers 70 and restore the split portion of the stack onto the turntable, consists of a horizontally-swinging lever 162 pivoted at 163 on the platform 30 and carrying a pin or roller 164 engaging an inwardly and outwardly directed cam groove 165 formed in the lower flanged portion 166 of the cylindrical cam 81. The outer end of the lever 162 is connected by a link 167 to an arm 168 projecting from the cam member 159. During play position, the cam groove 165 is disposed as shown in Figure 3, wherein the lever-pin 164 is located at the crotch or centrally between the outwardly diverging branches 165ᵃ, 165ᵇ of such cam-groove. When the record has completed its play, then motion is transmitted to the cylindrical cam 81 and the lever 162 is immediately swung outwardly by the trailing or upper branch 165ᵃ (viewing Figure 3) of the cam-groove 165 to cause the tone arm post cam member 159 to swing in a counterclockwise direction, thereby rocking the pendant back plate 157 outwardly, elevating the tone arm from engagement with the record and ultimately swinging the tone arm outwardly to a position clear of the record stack and at one side of the turntable, this position of the parts being shown in Figure 14 and by dotted lines in Figure 15. The tone arm is held in this outwardly-swung position by reason of the lever 162 engaging the main or circular portion of the cam-groove 165, and is not released again until another record has been selected and set in position for play, at which time the lever-pin 164 enters the leading portion 165ᵇ of the cam-groove and thereby turns the tone arm post cam member 159 in a clockwise direction to cause its radial lug 161 to recede from the bar 160 and hence allow the tone arm to swing inwardly.

To compel the tone arm to swing inwardly into playing engagement with the record, I provide a horizontally-swinging arm 169 pivoted on a stationary plate 170 projecting from the lower end of the tone arm supporting post 150 and arranged to abut at its free end against the horizontal portion of the L-shaped bar 160, a spring 171 connected to this arm tending constantly to urge the bar and the tone arm 32 associated therewith to an inwardly-swung position. By this construction, as the lug 161 on the cam member 159 recedes from the bar 160, the spring-urged arm 169 compels the tone arm to swing inwardly.

In swinging from non-play to play position the tone arm is held elevated by the back plate 157 and cam member 159 until such time as the needle of the tone arm is immediately over the starting portion of the sound groove of the record. This position of the tone arm is governed by a gravity-actuated pawl 172 applied to a plate 173 secured to the upper portion of the stay bar 155 and adapted in the cam-engaging position of the back plate 157, that is, in a position supporting the tone arm in its elevated position, to abut against a stop shoulder 174 formed in the upper edge of the back plate 157, so that when the tone arm, during its initial inward swing, reaches a position over the starting groove of the record it is arrested by such pawl engaging its companion shoulder. As previously stated, during the inward swing of the tone arm, the cam member 159 is swung in a direction to move its arm 161 away from the adjoining portion of the pendant bar 160 to allow the spring-actuated arm 169 to swing the tone arm inwardly. After the tone arm is arrested in this manner, the continued turning of the cam member 159 causes it to eventually ride off or be removed from supporting engagement with the pendant back plate 157 and allows the tone arm to swing downward by gravity to bring its needle into playing engagement with the record groove. As the back plate rides off the cam member 159 and swings inwardly, its upper edge bearing the pawl-engaging shoulder 174 is lowered, thereby disengaging such shoulder from the pawl to allow the free inward swing of the tone arm during playing of the record and in this position of the parts said pawl is supported at its free end on a flange 175 projecting inwardly from the lower edge of the pawl-bearing plate 173.

When the playing of a record is completed, the tone arm serves to automatically effect the shifting of the clutch collar 68 from its neutral position to clutching engagement with the worm wheel-collar 83, so as to transmit motion to the cylindrical cam 81 and restore the stack to original position in readiness to effect the selection of the next record. For this purpose I provide a vertically-swinging trip lever 176 pivoted at 177 to the plate 170, the outer arm of this lever being provided in its top edge with a series of teeth 178 terminating in an inclined portion or tail 179. Arranged for cooperation with this trip lever and particularly with the teeth and inclined portion thereof is a pendant pawl 180 supported on a pin 181 projecting from the horizontal portion of the L-shaped lever 160 which moves with the tone arm. The other arm of this trip lever 176 is provided in its lower edge with a latching shoulder 182 against which one end of a horizontally-swinging lever 183, pivoted intermediate its ends, at 184 to the platform 30, is adapted to engage. A spring 176ᵃ normally urges the trip lever into its latched position. Connected to the other end of the lever 183 is a pull rod 185 guided in a bracket 186 and terminating at its free end in a hook or depending portion 187 adapted for coupling engagement with an extension 188 of the clutch-controlling tie bar 133. A spring 189 applied to this pull rod between the lever 183 and the bracket 185 serves to constantly urge the same and said lever in a direction to swing the tie bar 133 from coupling engagement with the clutch-shifting lever 69. During the playing position, the trip lever 176 is in the position shown in Figure 12 wherein the lever 183 is in abutting engagement with the shoulder 182 to hold such lever and associated parts in clutch-released position. When the playing of the record is completed and the needle encounters either the eccentric or spiral lead-in type of groove, a movement is imparted to the tone arm which causes the pawl 180 to trip the lever 176 in a direction to disengage its shoulder 182 from the lever 183, whereupon the spring 189 applied to the pull rod 185 causes the latter to move in a direction to disengage the tie bar 133 from the clutch-controlling lever 69 to thereupon cause its spring 69ᵃ to shift the clutch collar 68 into clutching engagement with the cylindrical cam 81 to restore the parts to their initial position.

During the movement of the tone arm to its outward position effected through the medium of the cam-actuated lever 162, and at the time when the lever-pin 164 is engaging the trailing portion 165ᵃ of the cam groove 165, I provide means for automatically restoring the lever 183 to its latched position with the tone arm trip lever 176. This means consists of a tappet pin 190 applied to the link 167 disposed between the cam member arm 168 and the lever 162 and an adjustable trip finger 191 applied to the trip-controlled lever 183, so that during the outward swing of said lever 162, viewing Figures 3 and 5, the tappet pin encounters the trip finger 191 and causes a swinging of the lever 183 to its initial position for latching engagement behind the shoulder of the trip lever 176. The trip finger 191 is mounted on the inner arm of the lever 183 and is adapted to be laterally adjustable, when desired, through the medium of a pin and slot connection 192.

When a record is selected for play by depressing one of the selector rods 91, means are provided for shifting the slidable bar 149 lengthwise of the bail or crank 148 to bring such bar to a position in register with the companion selector rod engaging lever 95 in readiness to restore that lever to its initial position when the selection is completed. To this end a spring-urged horizontally-swinging lever 193 is provided which is pivoted at its inner end at 194 to the platform 30 and which is connected at its outer or front end by a link 195 with the slide bar 149 to shift the latter in accordance with the swinging movements of such lever. This lever is actuated during the rotation of the elevating cam 56 for raising and lowering the turntable to the height at which the selected record is to be played, and for this purpose a selector cam 196 is fixed on the lower end of the cam shaft 57 in peripheral contact with a pin or roller 197 applied to the lever 193 as shown in Figure 5. The turntable-elevating cam 56 and the slide bar selector cam 196 are so gyrated and proportioned as to effect like stages of movement to the parts controlled, respectively, all to the end that when a given record is selected and the turntable raised to the elevation for playing it the slide bar 149 will be accordingly shifted to a position on the bail or crank 148 in alinement with the lever 95 of the selector rod 91 companion to the selected record. By this construction, when a pre-selected record has been elevated to its playing height the slide bar 149 is simultaneously shifted on its bail and brought to rest in register with the projected lever 95 companion to that of the depressed selector rod which was previously depressed in selecting the record for play. In this position, the bar 149 is in a preset position to subsequently restore the lever 95 to its initial position, and in so doing open the companion switch 98, 99 associated therewith. As previously stated, the restoration of these levers 95 to their initial switch-opening positions is accomplished automatically, during the time that the record stack is being split to form a clearance above the selected record to be played, through the medium of the trip lever 143 actuated by the tappet 142 on the gear 86 of the stack-elevating cam shaft 82 in conjunction with the rock lever 146 which functions to rock the slide bar carrying bail 148 forwardly to bring the slide bar into engagement with the companion lever 95 to restore it and its companion switch element 98 to open position.

Figure 16:
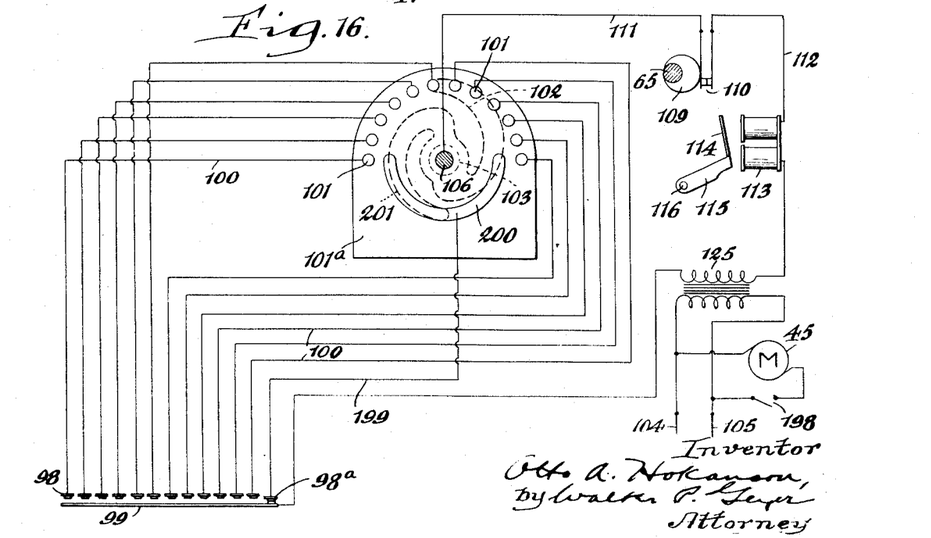
Figure 16 is a diagrammatic view of the electric circuit of the selector mechanism.

In practice, this automatic phonograph is coin-controlled and included in the circuit of the motor 45 for operating the respective parts of the phonograph mechanism is a switch 198 which is coin-controlled in any usual and well-known manner. When the patron desires to have three records played, he makes his corresponding selections at the push buttons 92 to establish the circuit of the selector mechanism and then deposits the proper coin value, say five cents for each record, in the coin slide applied to the phonograph, whereupon the motor circuit is then closed at the switch 198 and remains closed until the three records selected have been played. Should, however, the patron insert one or more coins in the coin slide and not make any selections at the push buttons, means are provided for automatically playing a number of records corresponding to the coin value deposited so that the patron will obtain the playing of records whether or not he himself makes any selection. In the machine shown in the drawings, twelve push buttons 92 and companion switch elements 98 are provided for playing a program of twelve different records or selections and in addition to these twelve companion selective units there is provided a thirteenth or non-selective unit, that is, one unit in excess of the selective units borne by the machine. This additional or thirteenth non-selective unit consists of a switch element 98ᵃ which is, in part, included in the circuit controlled by the companion switch elements 98 and which normally is in contact with the common switch element 99. However, in connection with this non-selective switch element 98ᵃ there is no companion selector rod or push button, such switch element, as before stated, being normally closed and is automatically opened whenever any one or more of the companion selective switch elements 98 have been closed by reason of selections being made at the push buttons. As shown in Figure 16, the switch element 98ᵃ is connected by a wire 199 with an arcuate contact segment 200 applied to the lower portion of the insulating panel 101ᵃ and arranged on the arc of a circle of less diameter than the arc on which the terminals 101 are arranged. The revolvable contact or wiper member 103 includes a second arm 201 which is substantially diametrically opposed to the companion arm 102 thereof cooperating with the terminals 101 and which cooperates with the contact segment 200. The latter is so disposed relative to the spaced terminals 101 as to always have contact with the revolving switch arm 201 when the companion switch arm 102 is traveling in the operating range of said terminals 101.

Connected to and extending forwardly from the upper end of the switch element 98ᵃ is a forked member 202 which embraces a vertically-swinging bail or crank 203 pivotally supported in end walls of the frame 140 between the switch elements 98 and the button-controlled levers 95. This bail normally bears at its front side against the opposing inner edges of the levers 95 and in the upright or non-projected position of the latter the bail assumes a slightly rearwardly-inclined position as shown in Figure 7, at which time the several selective switch elements 98 are open and the non-selective switch element 98ᵃ is closed by its inherent spring tension. In this position, the crotch of the forked member 202 abuts the rear side of the bail 203. By this construction, when any one of the levers 95 is pushed inwardly to close a companion switch element 98 as a result of a patron making a corresponding selection at the push-buttons 92, the bail 203 is swung forwardly by that lever to the position shown by dotted lines in Figure 9 to simultaneously open the non-selective switch element 98ᵃ through the medium of the forked connection 202.

When it is desired to cancel a selection once made, this may be done through a cancelling rod or button 204 guided in the face plate 93 alongside the buttons 92 and operatively engaged at its inner end to one arm of a rock lever 205, the other arm of such lever being connected by a spring 206 with a crank arm 207 fixed on the adjoining end or journal of the bail or crank 203. Thus, by depressing the cancelling button 204, after a selection has been made and wherein the bail and the crank arm 207 are in their forwardly-projected positions, these parts will be restored to their initial positions and the companion selective switch element 98 will be opened and the non-selective switch element 98ᵃ will be automatically closed.

In Figures 17–22, inclusive, there is shown a modified form of record-supporting tray as well as a modification of the engaging fingers which cooperate therewith for effecting the splitting of the record-stack for playing a selected record. The trays 208, in this instance, are substantially pan-shaped and each has a substantially upright cylindrical wall 209 and an annular, outwardly-extending flange 210 at the base thereof. In the stacked position of the trays, the base of one rests upon the top edge of the cylindrical wall of the one immediately below it, thereby leaving uniformly-spaced annular grooves or channels 211 between adjoining trays for receiving the elevating fingers.

Figure 17:
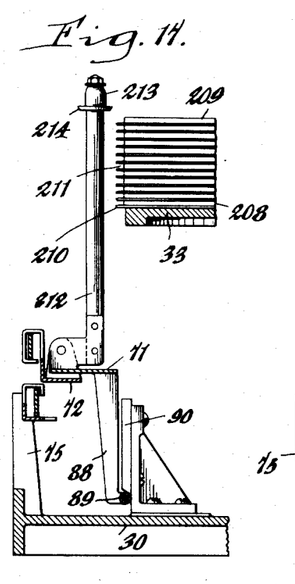
Figures 17, 18 and 19 are fragmentary sectional views of a modified form of the stack-splitting mechanism showing its various positions relative to the turntable during the selection of a record for play.
Figures 18, 19:
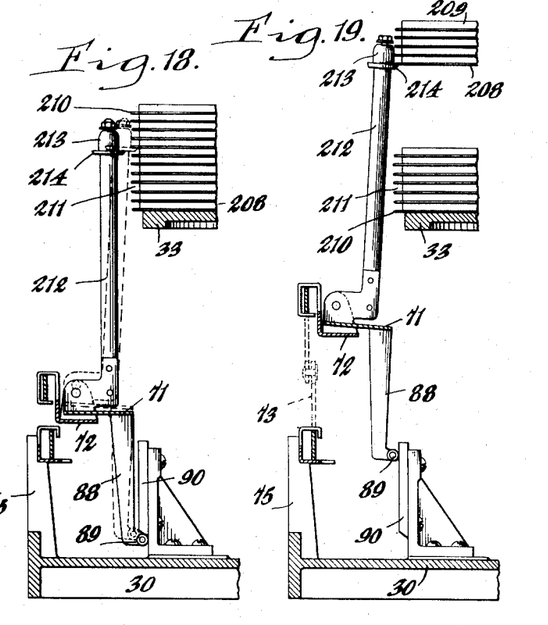
Figures 20, 21, 22:
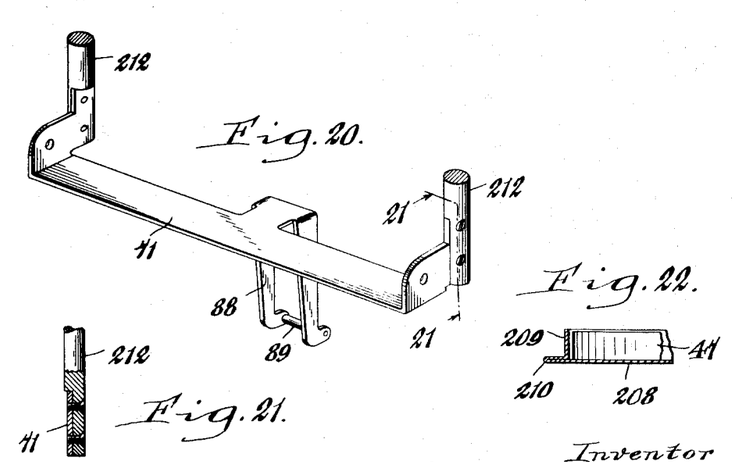
Figure 20 is a perspective view of the rock bar of the stack-splitting mechanism shown in the aforesaid figures.
Figure 21 is a transverse vertical section taken on line 21—21, Figure 20.
Figure 22 is an enlarged section through the corner of a modified form of record tray.

Each of the elevating fingers, seen in Figures 17, 18 and 19, consists of a post 212 rising from each end of its companion rock bar 71 and having a freely rotatable record-tray engaging member 213 at its upper end, such member being free to rotate from contact with the trays when its post is swung inwardly into engaging relation therewith. At its lower end this rotatable member has an outwardly-facing flange 214 which is adapted to enter the channels 211 between the trays for supporting engagement with that tray immediately above the one selected for play. Figure 17 shows the normal relationship existing between the turntable 33 and the elevating posts when the phonograph is at rest or inoperative; Figure 18 shows the relationship existing when the turntable is elevated to a record-selecting position; and Figure 19 shows the relationship of these parts when the record-stack has been split to provide the operating clearance for the tone arm when playing the selected record.

Figures 23, 24, 25:
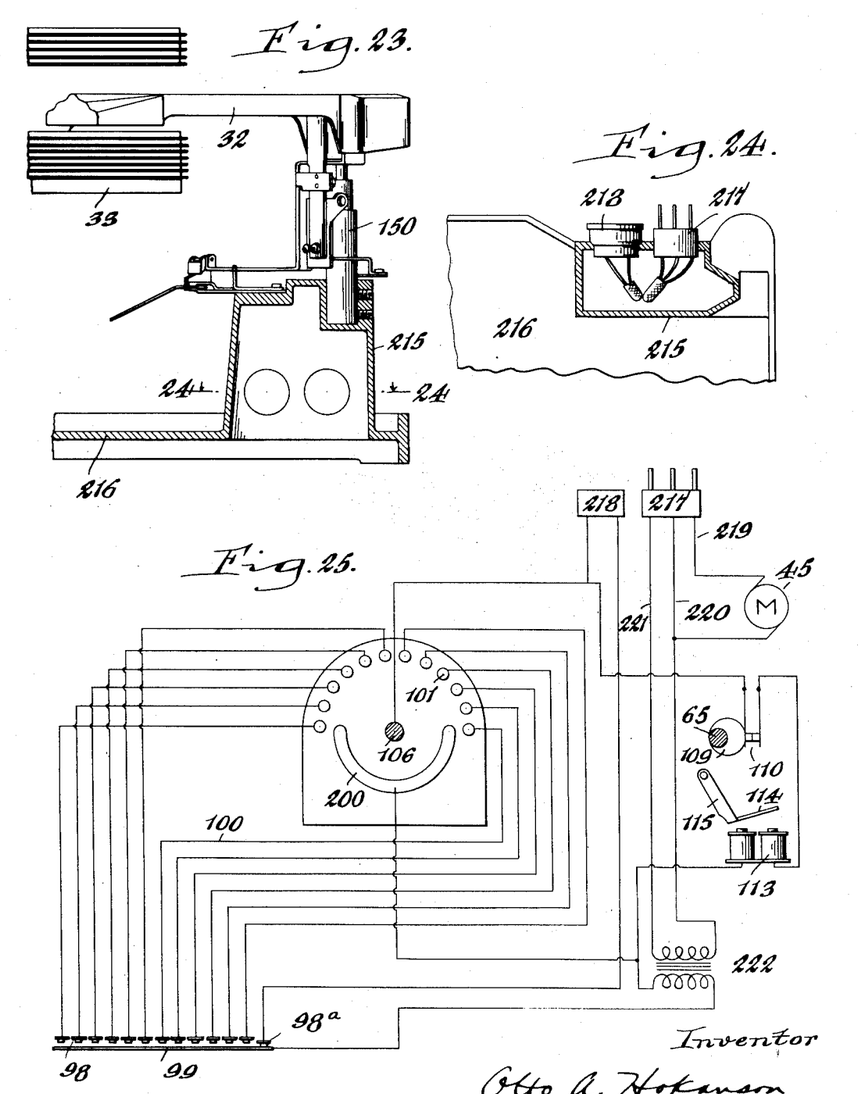
Figure 23 is a fragmentary side view, partly in section, of a modified form of mounting for the tone arm.
Figure 24 is a horizontal section taken on line 24—24, Figure 23.
Figure 25 is a diagrammatic view of a slightly modified form of the selector circuit.

Referring to the modifications of the invention shown in Figures 23, 24 and 25, the tone arm 32 and associated parts, including the supporting post 150, are mounted in a hollow boss or extension 215 formed in the base plate 216 which supports the working parts of the phonograph mechanism. Borne by this extension are suitable electric plugs or connectors 217 and 218, whereby the phonograph can be readily connected to a service line and to a coin-controlled magazine switch, respectively. The connector 217 is of the three-way type and, as shown in Figure 25, the high voltage leads 219 and 220 are connected to the motor 45 while the lead 221 as well as the continuation of the lead 220 are connected to a transformer 222 whereby low voltage is used to operate the selector mechanism and other parts of the phonograph.

I claim as my invention:

1. In an automatic phonograph, a turntable adapted to support a plurality of superposed records thereon, selective record-engaging means for supporting and elevating those records above a record selected for play to provide an overhead clearance space therefor, a sound reproducing unit movable in said space in playing engagement with the selected record, and record-selecting means for governing said record-engaging means including a plurality of selective elements corresponding in number to the records and operable at the will of the user for selecting the record-program desired, a non-selective element normally operable to render said record-selecting means operative to play a record when said selective elements are not rendered operative, and a selector-registering means correlated with said selective and non-selective elements for controlling said selective record-engaging means.

2. In an automatic phonograph, a vertically-adjustable turntable adapted to support a plurality of records, a tone arm supported for swinging movement in a horizontal plane, means for elevating the turntable to variable heights to bring a selected record into playing position relative to the tone arm, record-engaging means for supporting and elevating those records of the stack above the record selected for play to provide an overhead clearance space for the travel of the tone arm during playing of a record, and record-selecting means for governing the selective movements of said turntable-elevating means and said record-engaging means including a plurality of selective elements corresponding in number to the records and operable at the will of the user for selecting the record-program desired, and a non-selective element normally operable to render both of such means operative to play a record when said selective elements are not rendered operative, and a selector-registering means correlated with said selective and non-selective elements for controlling the selective movements of the turntable-elevating and record-elevating means.

3. In an automatic phonograph, a vertically-adjustable turntable adapted to support a plurality of records, a tone arm supported for swinging movement in a horizontal plane, means for elevating the turntable to variable heights to bring a selected record into playing position relative to the tone arm, record-engaging means for supporting and elevating those records of the stack above the record selected for play to provide an overhead clearance space for the travel of the tone arm during playing of a record, and record-selecting means for governing the selective movements of said turntable-elevating means and said record-engaging means including an electric circuit containing a plurality of normally-open selective switches corresponding in number to the records and operable to a closed position at the will of the user for selecting the record or records desired, a normally-closed non-selective switch operable to render both of said means operative to play a record when said selective switches are open and not selectively closed by the user, and means for opening said non-selective switch whenever a selective switch is closed.

4. In an automatic phonograph, a vertically-adjustable turntable adapted to support a plurality of records, a tone arm supported for swinging movement in a horizontal plane, record-engaging means for supporting and elevating those records of the stack above a record to be played to provide an overhead clearance space for the playing movement of the tone arm, means for controlling in predetermined sequence the elevation of the turntable to a record-selecting playing position and the record-engaging means to an elevation to provide said clearance space, means for initiating the operation of said controlling means, and record-selecting means for governing said controlling means including an electric circuit containing a plurality of normally-open selective switches corresponding in number to the records and operable to a closed position at the will of the user for selecting the record or records desired, a normally-closed non-selective switch operable to render said sequence-controlling means operative to play a record when said selective switches are open and not selectively closed by the user, selector switch-registering means included in the circuit of said selective and non-selective switches, respectively, for governing said means for initiating the operation of said controlling means, and means common to said selective switches for effecting the opening of said non-selective switch whenever a selective switch is closed.

5. In an automatic selective phonograph, a tone arm, a vertically adjustable turntable for supporting a stack of records, means for moving the turntable from an initial position to different elevations in accordance with the positions of the records in the stack to present a given record for engagement with the tone arm and for returning the turntable to its initial position after the playing of that record, means for splitting the stack at the record to be played and for elevating those records above it to provide an operating clearance for the tone arm and for returning the split portion of the stack onto the turntable after the playing of a record, motivating means including a clutch for governing the selective movements of said turntable and said stack-splitting means, a plurality of record-selector elements corresponding in number to the records, a corresponding number of selective switches operatively-controlled by said selector elements and a normally-closed non-selective switch, an electric circuit including said selective switches and said non-selective switch, electrically-controlled means correlated with and initiated by the closing of said circuit through the medium of said selective or non-selective switches for governing said clutch to control the selective movements of the turntable and the stack-splitting means to record-play position, and means initiated by the tone arm after the playing of a record for governing said clutch to restore the stack-splitting means and the turntable to their initial positions.

6. In an automatic selective phonograph, a tone arm, a vertically adjustable turntable for supporting a stack of records, means for moving the turntable from an initial position to different elevations in accordance with the positions of the records in the stack to present a given record for engagement with the tone arm and for returning the turntable to its initial position after the playing of that record, means for splitting the stack at the record to be played and for elevating those records above it to provide an operating clearance for the tone arm and for returning the split portion of the stack onto the turntable after the playing of a record, motivating means including a clutch for governing the selective movements of said turntable and said stack-splitting means, a plurality of record-selector elements corresponding in number to the records, a corresponding number of selective switches operatively-controlled by said selector elements and a normally-closed non-selective switch, an electric circuit including said selective switches and said non-selective switch, a plurality of individual contacts corresponding in number to and in circuit with the companion selective switches, an auxiliary contact in circuit with said non-selective switch, a revolving contact member in said circuit operatively connected to said motivating means and having arms thereon for engagement with said individual contacts and said auxiliary contact, respectively, for governing said clutch to control the selective movements of the turntable and the stack-splitting means to record-play position in accordance with the initial closing of the circuit through the medium of said selective or non-selective switches, and means initiated by the tone arm after the playing of a record for governing said clutch to restore the stack-splitting means and the turntable to their initial positions.

7. In an automatic phonograph, the combination with a record-changing mechanism including a part movable to a position to render said mechanism operative and bring a record to play position and to another position to bring a record out of play position, of an electrically-controlled selective mechanism including an electric circuit containing a plurality of normally open selective switches corresponding in number to the records and operable at the will of the user for selecting the record-program desired and a normally closed non-selective switch, means for opening said non-selective switch whenever a selective switch is closed, and a multiple switch unit in said circuit and in operative governing relation with said part to initiate its movement to bring the records selected for play by said selective switches or said non-selective switch into position for play, said switch unit including a plurality of independent contacts connected, respectively, to said selective switches and an auxiliary contact connected to said non-selective switch, and a movable switch member having contact arms for engagement with said independent and auxiliary contacts, respectively.

8. In an automatic phonograph, a vertically adjustable turntable adapted to support a stack of records, a tone arm supported for swinging movement in a horizontal plane, means for elevating the turntable to variable heights to bring a selected record in playing position relative to the tone arm, and record-engaging means for supporting and elevating those records of the stack above the record selected for play to provide an overhead clearance space for the travel of the tone arm during playing of the selected record and including freely rotatable members having flanged portions in supporting engagement with the records.

9. In an automatic phonograph, a vertically adjustable turntable adapted to support a stack of records, a tone arm supported for swinging movement in a horizontal plane, means for elevating the turntable to variable heights to bring a selected record in playing position relative to the tone arm, individual trays for the records and each having a substantially pan-shaped record-receiving portion and an outwardly-extending base-flange, whereby in their stacked position on the turntable the base of one tray rests upon the top edge of the pan-portion of the subjacent tray to provide an annular space therebetween, and means for supporting and elevating those trays of the stack with their records above the record selected for play to provide an operating clearance for the tone arm during playing of the selected record and including freely rotatable members having portions for peripheral contact with the tray-flanges and flanged portions engageable in one or another of the annular spaces between the record-trays for supporting engagement with the base-flange of that record-tray above the one containing the record selected for play.

10. In an automatic phonograph, a vertically-movable turntable having a pendant supporting collar and a spindle having an upper, record-engaging portion extending above the table and a lower portion extending through said collar, a rotatable drive-sleeve having a feather connection with the lower portion of said spindle whereby the latter is driven by and permitted axial displacement relative to said sleeve, a vertically-swinging actuating lever, and a bearing ring swiveled on said lever for engagement with the lower end of said pendant collar and having an elongated opening therein engaging said drive-sleeve.

11. In an automatic phonograph, the combination with a record-changing mechanism including a part movable to a position to render said mechanism operative and bring a record to play position and to another position to bring a record out of play position, of an electrically-controlled selective mechanism including an electric circuit containing a plurality of normally-open selective switches corresponding in number to the records and in operative governing relation with said part to initiate its movement to selectively bring the records desired to play position and operable at the will of the user for selecting the record-program desired, a normally-closed non-selective switch operable to govern said part to render said mechanism operable to play a record or records when said selective elements are not rendered operative, manually operative elements disposed in cooperative relation with and corresponding in number to said selective switches and individually displaceable by the patron to positions to directly close the companion switches, a shiftable member disposed along and in adjoining relation with said selective switch-operating elements and normally abutting the same in switch-opening position, and means connecting said non-selective switch with said shiftable member, whereby when any one of said selective switches is closed said shiftable member is actuated by the companion switch-operating element in a direction to open said non-selective switch.

12. In an automatic phonograph, a vertically adjustable turntable adapted to support a stack of records, a tone arm supported for swinging movement in a horizontal plane, means for elevating the turntable to variable heights to bring a selected record in playing position relative to the tone arm, individual trays for the records and each having a substantially pan-shaped record-receiving portion and an outwardly-extending base-flange, whereby in their stacked position on the turntable the base of one tray rests upon the top edge of the pan-portion of the subjacent tray to provide an annular space therebetween, and means for supporting and elevating those trays of the stack with their records above the record to be played to provide an operating clearance for the tone arm during playing of such record, and including members engageable in one or another of the annular spaces between the record-trays for supporting engagement with the base-flange of that record-tray above the one containing the record to be played.

13. In a phonograph, a table for supporting a stack of records, and record-engaging means disposed at different radial points about and common to the records and movable into and out of engagement with one or another of the records for supporting and elevating a certain record or records, said means including freely rotatable members having flanged portions adapted for supporting engagement with one or another of the records in the stack.

14. In a phonograph, a vertically-adjustable table for supporting a stack of records, individual pan-like trays for receiving the records and each tray having an outward annular projection forming a shoulder, the several shoulders of the respective trays providing uniformly-spaced, intervening annular grooves between them, elevating means including freely rotatable elements movable into and out of one or another of said grooves for supporting engagement with a companion tray shoulder, and means for vertically adjusting said turntable to variable positions to present one or another of the shoulder-forming grooves for registering relation with said elevating means.

15. In an automatic selective phonograph, a turntable, a tone arm, a plurality of records disposed in cooperative relation with the turntable for selective movement into and out of playing engagement with the tone arm, a record-changing mechanism including a drive means having a clutch movable to a position to render such mechanism operative to bring a record into and out of play position, a plurality of record selector elements corresponding in number to the records, an electric circuit including a plurality of normally open switches companion to and operable by said selector elements to a selective switch-closing position, a plurality of terminals in said circuit companion to said switches, a movable contact arm arranged to traverse said terminals for closing the circuit through one or another of said switches, a make and break switch in said circuit movable to a closed position when said contact arm is in contact with one or another of its companion terminals, an electrically-actuated device in said circuit and operatively connected to said clutch for shifting the latter to a position for actuating the record-changing mechanism to bring a given selected record into play when said circuit is closed, means operatively connected to said clutch for governing its movement at a predetermined time in the selecting cycle to a neutral position, and means operatively connected to said clutch and initiated by the action of the tone arm after playing of the selected record for governing the movement of the clutch to a position to restore the record-changing mechanism to its initial position.

16. In a phonograph, superposed record trays each having an annular shoulder at its periphery, and means engageable with said trays for controlling the selective playing of the records comprising freely rotatable members adapted for peripheral bearing contact with said tray-shoulders and having flanged portions engageable in one or another of the annular spaces between the tray-shoulders for supporting engagement with the underside of the companion tray-shoulder.

17. In an automatic phonograph, a vertically-movable turntable for supporting a plurality of records in stack-like fashion, individual trays for the records each having a record-receiving portion and an outward annular projection, whereby in their stacked position on the turntable the trays are provided with intervening downwardly-facing shoulders, means disposed within the range of vertical movement of the turntable and releasably engageable with one or another of the record-tray shoulders for predetermining the splitting of the record stack above the record to be played, means for effecting a relative elevational movement between the turntable and said record-engaging means to complete the stack-splitting operation with the lower portion of the split stack supported on the turntable and the upper portion thereof supported on said record-engaging means in spaced overhead relation to the top record on the turntable, said record-engaging means being movable toward and from the record stack, means for governing the movement of said record-engaging means into and out of supporting engagement with one or another of the record-trays in the stack, and record-selecting means for governing the stack-splitting operation including a plurality of selective elements corresponding in number to the records and operable at the will of the user for pre-selecting the record program desired, and a non-selective element normally operable to render the phonograph operative to play a record when said selective elements are not rendered operative.

18. In an automatic phonograph, a turntable for supporting a plurality of records in stack-like fashion, a tone arm, means disposed in operative relation with the stack of records on the turntable and releasably engageable with one or another of the records for predetermining the splitting of the record stack above the record to be played, selectively-controlled mechanism for effecting a relative elevational movement of the turntable and said record-engaging means for splitting the stack at the record to be played to provide an operating clearance for the tone arm, means for initiating the operation of said mechanism, and record-selecting means for governing the selectively-controlled mechanism including a plurality of selective elements corresponding in number to the records and operable at the will of the user for selecting the record-program desired, a non-selective element normally operable to render said record-selecting means operative to play a record when said selective elements are not rendered operative, and a selector-registering means correlated with said selective and non-selective elements for controlling said selectively controlled mechanism.

19. In an automatic phonograph, a turntable for supporting a plurality of records in stack-like fashion, a tone arm, means disposed in operative relation with the stack of records on the turntable and releasably engageable with one or another of the records for predetermining the splitting of the record stack above the record to be played, selectively-controlled mechanism for effecting a relative elevational movement of the turntable and said record-engaging means for splitting the stack at the record to be played to provide an operating clearance for the tone arm, means for initiating the operation of said mechanism, and record-selecting means for governing the selectively-controlled mechanism including an electric circuit containing a plurality of normally-open selective switches corresponding in number to the records and operable to a closed position at the will of the user for selecting the record or records desired, a normally-closed non-selective switch operable to render said mechanism operative to play a record when said selective switches are open and not selectively closed by the user, selector-switch registering means included in the circuit of said selective and non-selective switches, respectively, for governing said means for initiating the operation of the selectively-controlled mechanism, and means common to and disposed for actuation by any one of the selective switches, for simultaneously opening said non-selective switch whenever a selective switch is closed.

20. In an automatic phonograph, a tone arm, a turntable, a plurality of records disposed in cooperative relation with the turntable for selective movement into and out of playing engagement with the tone arm, selectively-controlled mechanism operatively associated with the records for moving them at predetermined times into and out of playing position, means for initiating the operation of said mechanism, and record-selecting means for governing the selectively-controlled mechanism comprising a plurality of selector elements corresponding in number to the records and operable at the will of the user for selecting the record-program desired, an electric circuit including a plurality of normally-open selective switches corresponding in number to said selector elements for actuation thereby to a closed position and a normally-closed non-selective switch operable to render said selectively-controlled mechanism operative to play a record when the companion selective switches are open and not selectively closed by the user, means selectively registrable at predetermined times with one or another of the selectively-closed switches for restoring them to their normally open position, and means common to and disposed for actuation by any one of the selective switches for opening said non-selective switch whenever a selective switch is moved to a closed position.

21. In an automatic phonograph, a tone arm, a turntable, a plurality of records disposed in cooperative relation with the turntable for selective movement into and out of playing engagement with the tone arm, selectively-controlled mechanism operatively associated with the records for moving them at predetermined times into and out of playing position, means for initiating the operation of said mechanism, and record-selecting means for governing the selectively-controlled mechanism comprising a plurality of selector elements corresponding in number to the records and operable at the will of the user for selecting the record-program desired, an electric circuit including a plurality of normally-open selective switches corresponding in number to said selector elements for actuation thereby to a closed position and a normally-closed non-selective switch operable to render said selectively-controlled mechanism operative to play a record when the companion selective switches are open and not selectively closed by the user, means companion to said selector elements and actuated thereby for closing the respective normally-open selective switches when such elements are selected to render the selectively-controlled mechanism operative to play the records so selected, means common to said selector element actuated means and selectively registrable at a predetermined time with a given previously actuated switch-closing means to move it in a direction to open its respective switch, and means common to and disposed for actuation by any one of the selective switch-closing means for opening said non-selective switch whenever a selector switch is moved to a closed position.

22. In an automatic phonograph, a tone arm, a turntable, a plurality of records disposed in cooperative relation with the turntable for selective movement into and out of playing engagement with the tone arm, selectively-controlled mechanism operatively associated with the records for moving them at predetermined times into and out of playing position, motivating means including a clutch for governing the movements of said selectively-controlled mechanism, and record-selecting means for governing the selectively-controlled mechanism comprising a plurality of selector elements corresponding in number to the records and operable at the will of the user for selecting the record-program desired, an electric circuit including a plurality of normally-open selective switches corresponding in number to said selector elements for actuation thereby to a closed position and a normally-closed non-selective switch operable to render said selectively-controlled mechanism operative to play a record when the companion selective switches are open and not selectively closed by the user, a plurality of individual contacts corresponding in number to and in circuit with the companion selective switches, an auxiliary contact in circuit with said non-selective switch, a revolving contact member in said circuit operatively connected to said motivating means and having arms thereon for engagement with said individual contacts and said auxiliary contact, respectively, for governing said clutch to control the selective movements of the selectively-controlled mechanism to record-play position in accordance with the initial closing of the circuit through the medium of said selective or non-selective switches, and means initiated by the tone arm after the playing of a record for governing said clutch to restore the selectively-controlled mechanism to its initial position.

OTTO A. HOKANSON.